United States Patent [19]

Smith

[11] 4,051,811

[45] Oct. 4, 1977

[54] STARTING APPARATUS FOR RODEO EVENTS

[76] Inventor: Arthur C. Smith, Phoenix, Ariz.

[21] Appl. No.: 719,572

[22] Filed: Sept. 1, 1976

[51] Int. Cl.² .......................... A01K 1/00; A63K 3/02
[52] U.S. Cl. .................................... 119/15.5 A; 49/34
[58] Field of Search ....................... 119/15.5, 110–116; 272/4, 5; 340/279; 49/34

[56] References Cited

U.S. PATENT DOCUMENTS

| 2,276,500 | 3/1942 | Maddox | 119/15.5 |
| 2,560,116 | 7/1951 | Lucas et al. | 119/15.5 |

Primary Examiner—Hugh R. Chamblee

[57] ABSTRACT

A latching device detachably holds a flexible barrier across the exit opening of a contestant's stall, In response to a signal, the latching device releases the barrier and a timing device is activated. Disengagement of the barrier by the contestant prior to the signal activates a penalty indicating device.

7 Claims, 6 Drawing Figures

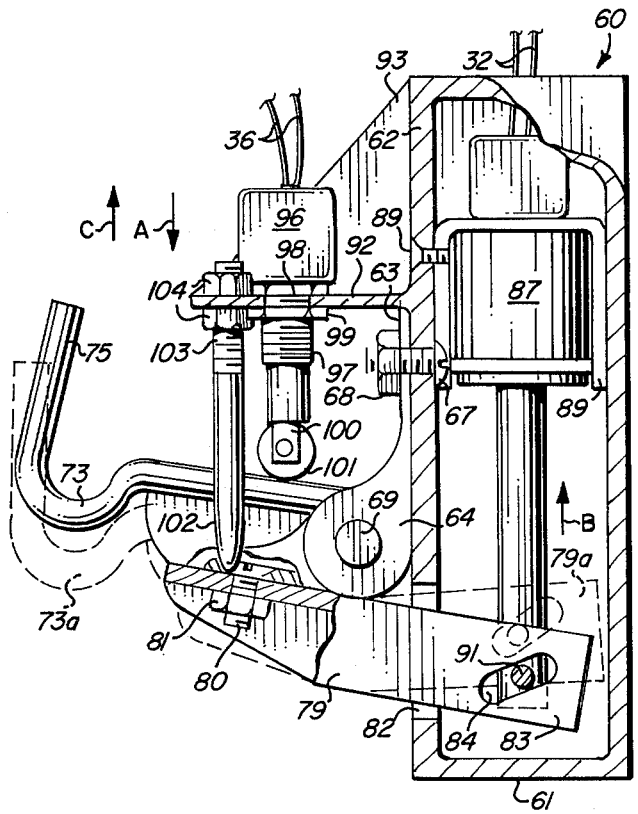
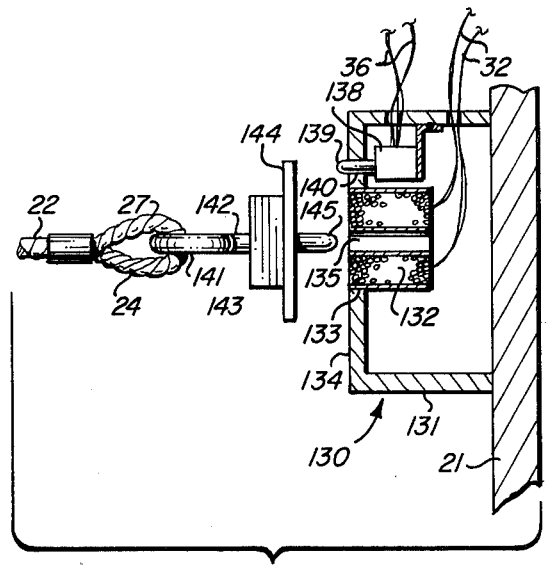
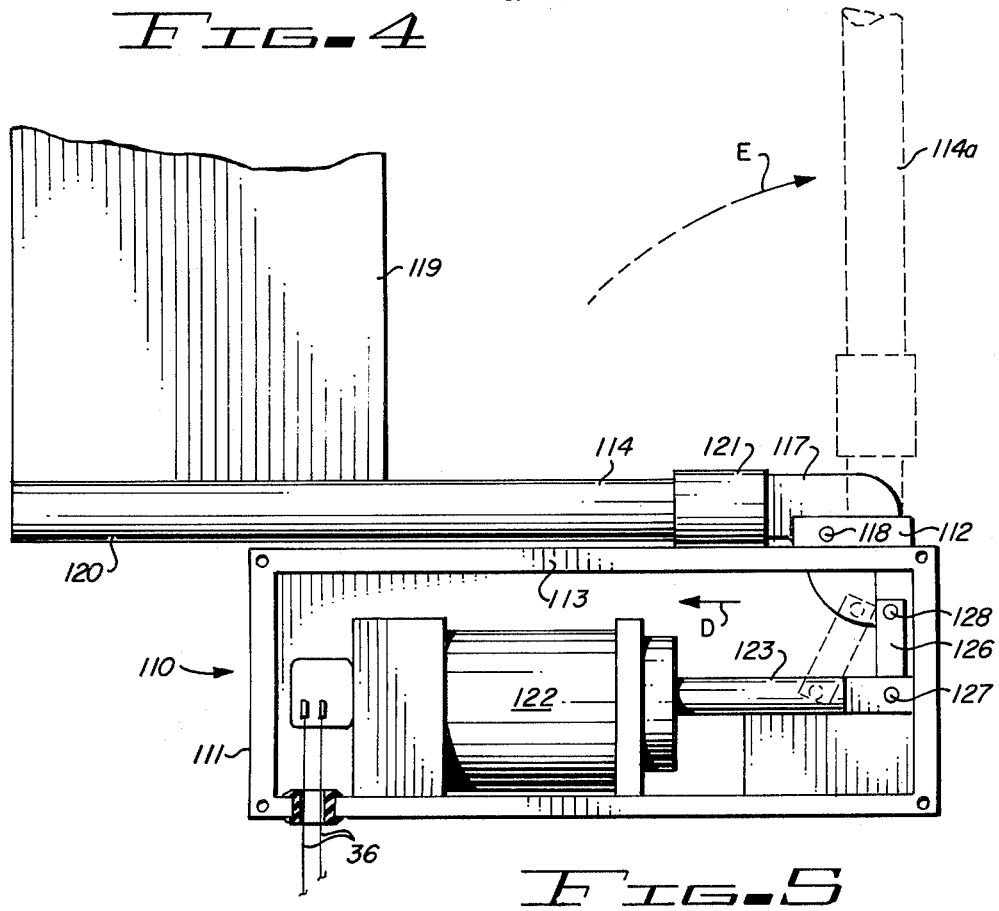

STARTING APPARATUS FOR RODEO EVENTS

This invention relates to the starting and timing of competitive events.

More particularly, the present invention concerns starting apparatus for use in combination with rodeos.

In a further aspect, the instant invention concerns means for starting a rodeo contestant from a stall during calf roping, bulldogging and similar events.

The rodeo is a popular form of western competition and entertainment. Based upon traditional skills, a rodeo includes various events involving bovine or equine animals, and a human contestant. Generally, the human contestant tests his abilities against the speed, strength and agility of the animal.

Exemplary are the events commonly known as calf roping and bulldogging. In such events, the contestant, mounted upon a horse, is detained in a stall, while a bovine animal is released from a nearby or adjacent stall into the arena. At a time subsequent thereto, the horse and rider can start leaving the detention pen in pursuit of the animal.

The competitors compete upon a timed basis. Each individual performance is handicapped in favor of the animal. This insures that the animal will be at a predetermined distance into the arena and acting upon its own will at the start of the event. When the animal has reached the predetermined distance, as determined by a line or other marker, a signal is displayed to the rider, at which time he can proceed. The handicap given the animal is established in accordance with the rules, as is the penalty for premature starting by the contestant.

In rodeo events, especially among highly competitive professional riders, the timing of events for judging is exceedingly critical. An event can be won or lost by a mere fraction of a second. In order to decrease the inherent human error in manual timing, various prior art devices have been proposed. Specifically, the devices are concerned with starting the horse and rider at an appropriate time or space relationship with the animal.

One concept involves two adjacent stalls, one for the contestant, and one for the animal. Each stall is closed by a gate leading to the arena. The gate of the animal stall is substantially further into the arena than the gate of the contestant's stall. Simultaneously, each gate is opened. Purportedly, the animal is given a favorable handicap, as determined by the distance between the two gates.

Numerous inherent limitations exist in such a device. For example, there is no assurance that the animal will exit the stall immediately, even if prodded. Should the animal, after leaving the stall, turn away from the contestant's stall, the contestant would have an obscured view of the quarry during the initial phase of the contest. The extended chute also interferes with the spectators' view of the contestant during the start. Further, since most contestants anticipate the start, either the rider or the horse can be hurt on the not yet open or partially open gate.

A later apparatus which sought to remedy certain deficiencies is similarly based upon adjacent stalls. The animal stall, in this case more appropriately termed the chute, likewise extends into the arena at a predetermined distance beyond the contestant's chute. Neither the chute nor the stall are provided with a gate. The flexible barrier extends across the exist opening of the contestant's stall and has a loop at one end thereof which is secured by a plunger operatively associated with an electric solenoid. The animal is driven through the chute into the arena. In response to the animal passing through the exit of the chute, a detecting device is actuated and emits a signal which energizes the solenoid to release the barrier.

The latter device more exactly defined the interval between the release of the animal and the start of the contestant. However, other problems persisted. It was still possible that the rider could lose visual contact with the animal and the extended chute obscured the participant's start from the spectators. Another primary deficiency remained.

It is traditional and desired in rodeo events that the contestant start on his own recognizance after receiving a signal. The contestant is assessed a penalty for anticipating the signal and starting prematurely. Gates or barriers which open only upon the signal eliminates this vital aspect of the contest. Therefore, it has become accepted practice to use a shortened barrier, tie a strong to the free end thereof, and secure the strings to the barrier locking device. The rider can, therefore, anticipate the signal, since the onrush of the horse will readily break the strings without injury. This arrangement is exceedingly makeshift and does not provide either the contestant, judges, nor the spectators with any indication of a premature start until the strings are examined by rodeo workers or referees. Further, if the strings have been broken, replacement is necessary by a time-consuming and laborious procedure prior to the participation of the next contestant.

It would be highly advantageous, therefore, to provide means for starting rodeo contestants which remedies the deficiencies of the prior art.

Accordingly, is a principal object of the present invention to provide improved starting apparatus for use in rodeo events.

Another object of the present invention is the provision of starting apparatus which will start the contestant in accordance with an exacting, predetermined handicap relative the animal.

And another object of the invention is the provision of a starting apparatus which will permit the contestant to start on his own recognizance in relation to a starting signal.

Still another object of the invention is to provide immediate indication that the contestant has started prematurely.

Yet another object of the invention is the provision of a starting apparatus which will not interfere with the vision of either the contestant, the spectators, or the judges.

And yet another object of the invention is to provide improved means for securing the barrier, whereby it is readily released during a premature start without injury or damage.

A further object of the instant invention is the provision of a starting apparatus which is readily installed and usable with pre-existing conventional rodeo stalls.

And a further object of the invention is to provide starting apparatus of the above type which is durably constructed and simply operated.

Briefly, to achieve the desired objective of the present invention, in accordance with a preferred embodiment thereof, provided is a starting system for use in combination with a pre-existing rodeo structure, which structure includes a first stall for retaining an animal and a second stall for detaining a contestant. The system includes means for detecting the arrival of the animal at a predetermined distance from the first stall, and for emitting a first signal in response thereto. Latch means detachably holds a barrier across the exit opening of the second stall, and releases the barrier in response to the first signal. The barrier is also released from the latch means in response to the force of the contestant's horse during a premature start. Switch means emit a second signal in response to release of the barrier prior to the reception of the first signal by the latch means. A first perceptive signalling device, indicating the start, is activated in response to the first signal. A second perceptive signalling device, indicating a premature start penalty condition, is activated in response to the second signal. The first signal may additionally concurrently initiate a clock for timing the contestant's performance.

In accordance with a preferred embodiment of the invention, the latch means comprises a latching device having a housing which is secured to one of the support members at either side of the exit opening of the contestant's stall. A hook-shaped member is pivotally connected to the latching device and detachably engages the free end of the barrier which is normally urged by biasing means to the other support member. The hook-shaped member is moved to a release position by electro-magnetic means activated in response to the first signal. The barrier is also readily disengaged from the latching means by the contestant during a premature start. Switch means responsive to the release of the barrier by the contestant activates the penalty signalling device.

The foregoing and further and more specific objects and advantages of the present invention will become readily apparent to those skilled in the art from the following detailed description thereof taken in conjunction with the drawings, in which:

FIG. 4 is a side elevatonal view of the latching device of FIG. 3 and partly broken away to reveal further details thereof;

FIG. 5 is a side elevational view of a perceptive signalling device useful in combination with the system of FIG. 1 and having the side cover plate thereof removed to expose the internal mechanism; and FIG. 6 is a side view of an alternate embodiment of a latching device, partly broken, constructed in accordance with the teachings of the present invention.

Figure 1:
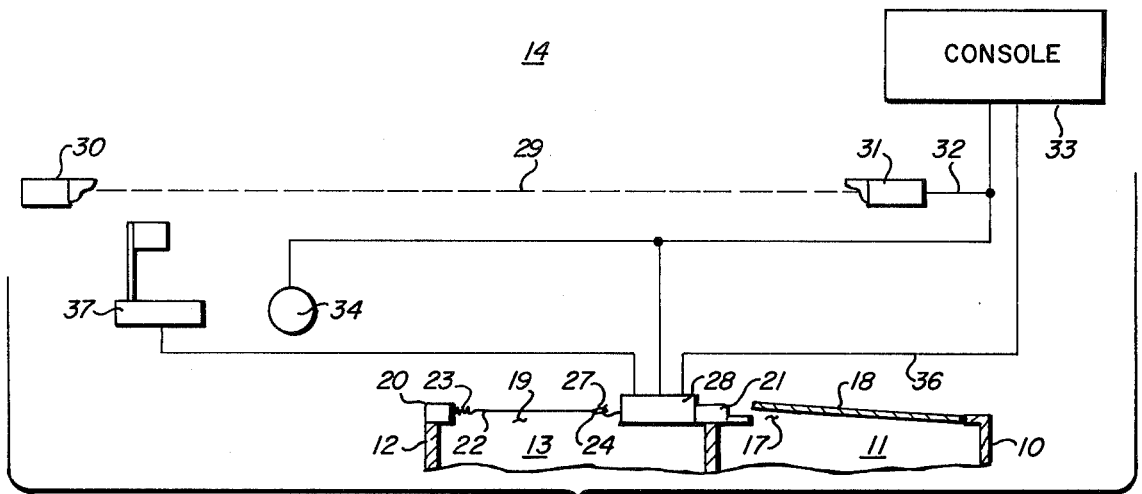
FIG. 1 is a diagrammatic representation of a starting system constructed in accordance with the teachings of the present invention.

Turning now to the drawings, in which the same reference characters indicate corresponding elements throughout the several views, attention is first directed to FIG. 1, which shows a conventional rodeo structure which includes a first stall 10 enclosing an animal retaining area 11, a second stall 12 enclosing a contestant detaining area 13, and an arena area 14. Animal retaining stall 10 has a frontal exit opening 17, closeable by hinged gate 18 and leading to arena area 14. Contestant stall 12 has an exit opening 19, defined between first and second stationary support members 20 and 21, respectively, and providing access to arena area 14. Support members 20 and 21 are the forward terminal portions of the sides of stall 13, which may be in the form of posts, and are referred to herein as first and second members, respectively, for purposes of references. Conventionaly, opening 19 is selectively closed by flexible barrier 22, constructed of rope, leather, canvas, or other suitable material. Barrier 22 is secured to first support member 20 by any suitable biasing means 23, which may even include discarded inner tubes or tires, which normaly urges the free end 24 away from second member 21 toward first support member 20.

In accordance with a preferred embodiment of the instant invention, a loop 27 is formed at the free end 24 of flexible barrier 22. Latching means 28 are secured to second stationary support member 21 and detachably and releasably engage loop 27. Preferred embodiments of latching means 28 will be described in detail presently. The term "release" as used herein refers to an operative function of latching means 28, whereby loop 27 is disengaged. Subsequently, barrier 22 is pulled from opening 19 by biasing means 23. The term "detachably" as used herein refers to the arrangement of latching means 28, whereby loop 27 is manually connected thereto and is readily disengaged therefrom in response to force against barrier 22 by the contestant or horse prior to the release action.

A line 29 is placed across arena area 14 at a predetermined distance from exit opening 19. The distance is predetermined by the rules of the contest and establishes the handicap in favor of the animal. In accordance with a preferred embodiment of the invention, line 29 is the light beam of an electronic detection system which includes an exciter lamp unit 30, which emits the beam and a photocell receiver unit 31, which receives the beam and detects that the beam has been broken. Photo cell receiver unit 31 emits a signal in response to disruption of beam 29. Suitable electronic detection units for this purpose are well known and commercially available. Such a unit is manufactured by Worner Electronic Devices, Rankin, Illinois, and sold undr the tradename "Worner 9000 Series Fotolectric Sets".

Line 29 could also be an actual line drawn on the arena floor, or a line of sight established by a judge. In either case, the judge could activate a switch to emit the signal concurrent with visually detecting that the animal has crossed the line. The use of an electronic detection unit is preferable in order to eliminate human error and reaction time.

The signal emitted by photocell receiver unit 31 i transmitted over conductor 32 which communicate with control console 33, latching means 28 and perceptible signalling device 34. Perceptible signalling device 34 may be in the form of a light which is visible to the contestant, spectators and the judges. Communication i also established by conductor 36 from console 33 through a switch in latching means 28 to a second perceptive signalling device 37. Second perceptive signalling device 37 is shown as being in the form of a flag which normally resides in the lowered position and i raised in response to a second signal carried through conductor 36. Further details of a preferred embodiment of signalling device 37 will be described hereinafter.

Figure 2:
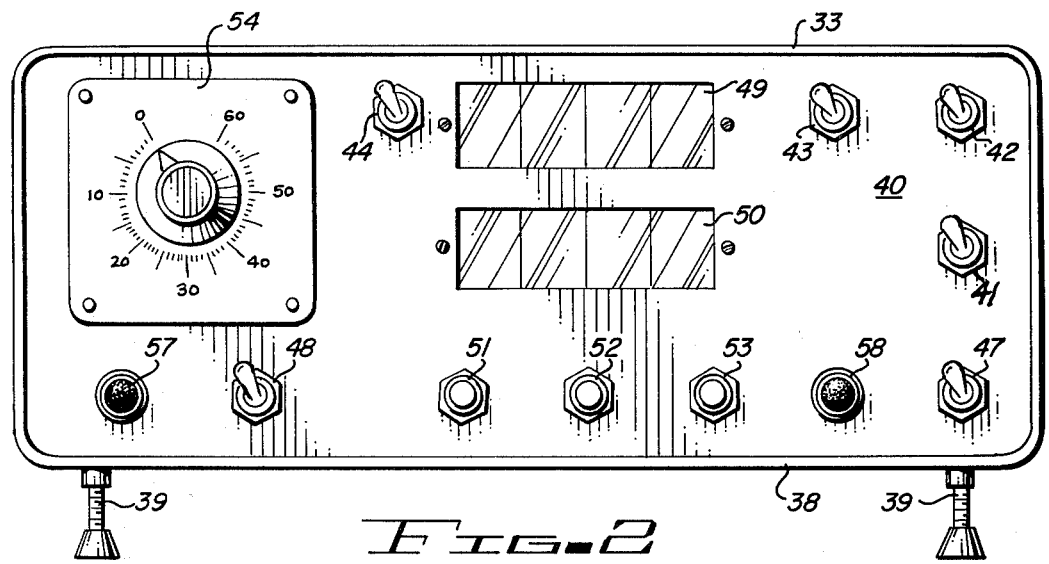
FIG. 2 is a plan view of the face of a preferred embodiment of a console useful with the system of FIG. 1.

Console 33, as seen in greater detail in FIG. 2, includes a housing 38 which is supported by legs 39. Pane 40 carries various displays and switches which are used by the judges for timing the event. First provided is main power switch 41 which controls the supply o electrical energy to the entire system. Preferably, switch 41 is of the toggle type having a "off" position and a "on" position. Other similar switches include electronic detector switch 42, digital display switch 43, countdown timer switch 44, penalty signalling device switch 47 and starting signalling device switch 48. Event timer 49 and penalty timer 50 are in the form of digital display clocks. Momentary contact switches 51, 52 and 53 for stop, reset and start, respectively, operatively control event timer 49 penalty timer 50. Also provided is a countdown timer 54 and display lights 57 and 58 for event start and penalty, respectively.

In the following description of the function and operation of the system, as set forth in FIGS. 1 and 2, the electrical circuitry associated therewith and communicating between the various components thereof, will not be herein described in detail. The specific functions can be accomplished by various electrical circuits, the embodiments of which will become readily apparent to those skilled in the electrical art having knowledge of the system, the components thereof, and the elements carried on the control panel of the console.

Main power switch 41 centrally controls the electrical energy to each of the various components of the system which, in turn, are provided with individual control switches. Electrical power to all of the components is immediately and simultaneously discontinued when switch 41 is moved to the "off" position. The operator, commonly a judge or official timer, initiates the system by placing switch 41 in the "on" position. Switch 42 is turned on, activating exciter amp unit 30 and photocell receiver unit 31 to project a light beam along line 29. Next, electrical energy is supplied to digital clock displays 49 and 50 by moving switch 43 to the "on" position. Digital displays 49 and 50 are reset to zero by depressing switch 52, which is of the momentary contact type, as are switches 51 and 53. Placing switch 47 in the "on" position establishes a potential communication among penalty clock display 50, penalty light 58, latching device 28 and penalty signalling device 37. A similar potential communication is established on event clock 49, event start light 57, photocell receiver unit 31 and perceptive signalling device 34.

After the animal and the rider are made ready in their respective stalls and just prior to the commencement of the event, the timer activates switch 42 which provides the final communication link, whereby the system is activated in response to interruption of the photoelectric beam. Switch 42 functions as a safety switch to prohibit premature initiation of the system by a worker or animal inadvertently interrupting the light beam. As gate 17 is opened, the animal instinctively leaves the confinement of retaining area 11 and heads for arena area 14. Preferably, switch 42 is activated just prior to the arrival of the animal at line 29.

Photocell receiver unit 31 detects the arrival of the animal at line 29 and emits a signal through conductor 32. The signal activates latching means 28 to release barrier 22 and energize perceptive signalling device 34. Simultaneously, the signal is received through conductor 32 by console 33 to energize and start event clock 49 and turn on light 58. Upon the signal that the contestant has completed his task, the timer depresses switch 51 to stop clock 49, which provides a permanent display of the contestant time. After the contestant's time is recorded, the operator depresses switch 52 to clear clock 49 and reset for the start of the next event. As shown herein, each clock 49 and 50 has four digital display units which will provide a readout of units, tens and hundreths of seconds. Other displays having more or less display elements are readily usable in the console.

In the event of a premature start by the contestant, disengaging barrier 22 from latching means 28 prior to the release thereof as above described, a second sequence is initiated. In response to the closing of a switch within latching means 28, second perceptive signalling device 37 is initiated and concurrently a second signal is transmitted through conductor 36 to console 33. On receipt of the second signal, penalty clock 50 is initiated and light 58 is turned on, as an indication to the timer that the contestant has created a penalty situation. Clock 50 may continue to run, being stopped concurrently with clock 49 when switch 51 is depressed. Alternately, clock 50 may be arranged to stop as the contestant crosses line 29 and breaks the light beam. In either case, the actual time of the penalty can be determined. Generally, the penalty time is multiplied by a constant and added to the contestant's event time as displayed on clock 49.

Countdown timer 54 has particular utility for those events in which the contestant must perform a task for a given time, such as animal riding. Countdown timer 54 can be operated either electronically or manually. In either case, the timer is set to a given time, usually seconds in accordance with the rules of the contest, prior to the start of the event. In manual operation, the timer throws switch 44 to the "on" position, energizing and starting the counter concurrent with the start of the event. When time has elapsed, or, in other words, the counter has returned to "zero", an internal switch is closed, energizing a third perceptive signalling device, such as a horn. Alternately, the countdown timer 54 may be activated in response to a signal from photocell receiver unit 31 after the judge or timer has placed switch 44 in the "on" position.

Figure 3:
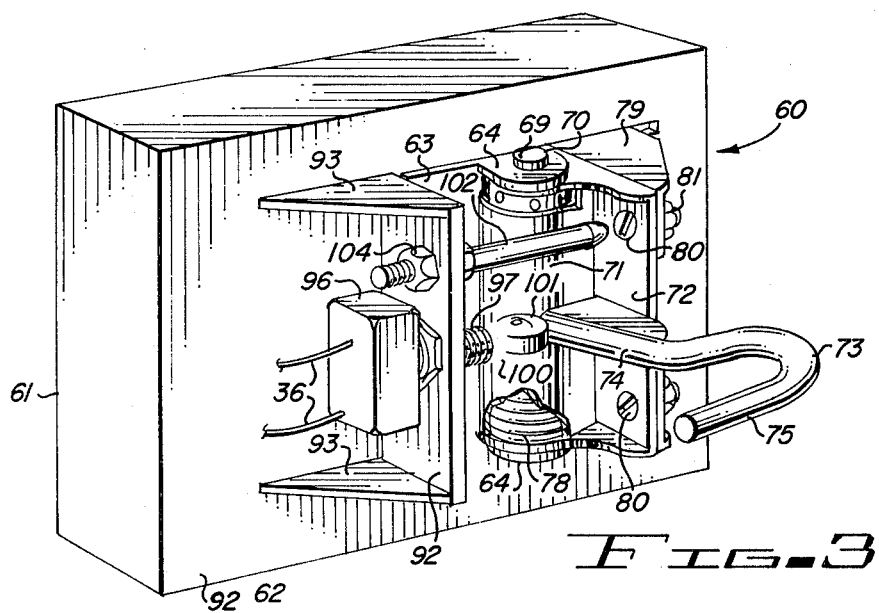
FIG. 3 is a perspective view of a latching device constructed in accordance with the teachings of the present invention, and used for detachably holding a barrier across the exit opening of a contestant's stall.

A preferred embodiment of a latching device, generally designated by the reference character 60, and usable as the latching means 28 in the foregoing system, is seen in FIGS. 3 and 4. Frame 61 is in the form of a box having mounting panel 62. Plate 63 having a pair of spaced ears 64 extending therefrom is secured to mounting panel 62 by bolts 67 and nuts 68. Pin 69 is carried by ears 64 extending through appropriately sized apertures therein. Pin 69 is provided with an enlarged head 70 which prevents the pin from falling downwardly and disengaging with ears 64. Tubular member 71, having the flange 72 extending therefrom, encircles pin 69 and resides between ears 64. Hook-shaped member 73 is secured along shank portion 74 thereof to flange 72 as by welding, and terminates at the free end thereof with a substantially straight section 75. Spring 78 is coiled about pin 69 within tubular member 71 and has respective ends bearing against plate 63 and flange 72 to normally urge hook-shaped member 73 in the direction of arrow A to reside in the dashed line position designated 73a in FIG. 4.

A pair of arms 79, as might be fashioned from angle iron, are secured in spaced relationship to flange 72 by bolts 80 and nuts 81. Each arm 79 extends through an appropriately sized lot 82 within mounting panel 62 and terminates with a free end 83 within box-shaped frame 61. An elongate slot 84 extends through each arm 79 proximate the free end 83 thereof. Slots 84 are oriented diagonally relative the longitudinal axis of each arm 79. An electric solenoid 87, having plunger 88 extending therefrom, is secured within frame 61 by means of screws 89, which extend through mounting panel 62 and threadedly engage solenoid frame 90. Pin 91 is carried proximate the free end of plunger 88 and resides within slot 84. Although only one solenoid 87 is herein specifically illustrated, it will be appreciated that two laterally arranged solenoids are carried by frame 61. Each solenoid is operatively engaged with a respective arm 79. Normally, plunger 88 is extended from solenoid 87 and, when energized, retracts in the direction of arrow B, urging arm 79 to the dashed line position 79a, and carrying hook-shaped member 73 to dashed line position 73a. Spring 78 is also capable of retracting plunger 88.

Mounting bracket 92 extends from the face of mounting panel 62 and is rigidly reinforced by gussets 93. A conventional plunger type switch 96 is secured to bracket 92 by means of threaded member 97 extending through aperture 98 and secured by nut 99. In accordance with conventional practice, plunger 100 is slideably carried within threaded member 97 and extends therefrom. The exposed end of plunger 100 carries a pivotally mounted contact roller 101, while the other end thereof is operatively associated with the contacts within switch 96. Switch 96 is a normally closed switch, and includes biasing means normally urging plunger 100 to an extended position. When hook-shaped member 73 is in the dashed line position 73a, switch 96 is normally closed. When plunger 73 is moved in the direction of arrow C to the solid line position, shank 74 abuts roller 101, depressing plunger 100 and closing switch 96. Adjustable stop means in the form of a rod 102 carried by bracket 92 limit the travel of hook-shaped member 73 in the direction of arrow C. For purposes of adjustability and attachment, rod 102 is provided with the threaded portion 103 extending through an appropriately sized aperture in bracket 92 and engaged with jam nuts 104 on either side thereof.

Latching device 60 is secured to support member 21 by any convenient means, such as screws or bolts extending through frame 61 into member 21, or conventional clamp or strap means encircling frame 61 and member 21. Latching device 60 is oriented, such that hook-shaped member 73 lies in a substantially horizontal plane with the terminal straight section 75 generally directed toward arena area 14. Electric solenoid 87 is connected to conductor 33 to receive the signal from photocell receiver unit 31. Switch 96 is connected with conductor 36.

Prior to the start of the event, loop 27 of flexible barrier 22 is engaged with hook-shaped member 73 and resides on the straight section 75 thereof. During the engagement of loop 27 with straight section 75, hook-shaped portion 73 is urged in the direction of arrow C and biasing means 23 is extended. The force of biasing means 23 urging barrier 22 toward member 20 holds hook-shaped member 73 in the direction of arrow C, generally as illustrated in solid line in FIG. 4. This is considered to be the retaining position. Switch 96 is held open when latching device 60 is in the retaining position, although an electrical potential exists in conductor 36.

Upon the signal from receiver unit 31, electromagnetic solenoid 87 is energized, retracting plunger 88 and pivoting arms 79 about pin 69, and moving hook-shaped member 73 to a releasing position, as indicated by the dashed outline 73a. During the releasing position, the straight section 75 is deflected slightly toward member 20, and loop 27 is pulled therefrom in response to the tension of biasing means 23. It is apparent that loop 27 may be readily disengaged from straight section 75 in response to force upon barrier 22 in the direction of arrow C by the contestant or his horse. Spring 78 is then free to move hook-shaped member 73 to the releasing position, allowing plunger 100 to extend, closing switch 96, and activating penalty signalling device 37 and penalty timing clock 50. Relay means within the system discontinues the electric potential to conductor 36 in response to the signal from receiver unit 31, such that the penalty signal will not be activated when latching device 60 is moved to the releasing position in response to solenoid 87.

The extent to which hook-shaped member 73 is held in the direction of arrow C during the retaining position is relatively unimportant, except to hold switch 96 in the open position. Experimentation has shown that when in the retaining position, straight section 75 is slightly deflected in the direction of member 21. Rod 103 prevents hook-shaped member 73 from being inadvertently moved sufficiently to injure switch 96. Experimentation has also shown that movement of hook-shaped member 73 in the direction of arrow A to establish a releasing position need not be very great, since the slightest deflection of straight section 75 toward member 20 will result in disengagement of loop 27.

FIG. 5 illustrates a preferred embodiment of a perceptive signalling device generally designated by the reference character 110 and useful in the foregoing timing and starting system, especially as the signalling device 37 thereof. Boxlike housing 111 has a pair of spaced lugs 112 extending upwardly from the top 113 thereof. An elongate slot extends between lugs 112. In the instant illustration, one lug 112 is not seen, since it resides directly behind the visible lug 112. Neither is the slot visible, however, the arrangement thereof will be immediately apparent. An elongate shaft 114 has a crank arm 117 at one end thereof which extends downwardly through the slot and is pivotally connected to lugs 112 by pin 118. A rigid rectangular panel 119 is carried proximate the free end 120 of shaft 114. Preferably, the panel 119 is decorated in a highly visible color and extends radially from shaft 114 to function as a signalling flag when shaft 114 is raised, as will be described presently. Resilient tubular member 121 encircles shaft 114 to function as a cushiony stop and rest when shaft 114 is brought to the lowered position, as illustrated in the solid outline. A solenoid 122, having a normally extended plunger 123, resides within box-like housing 111 and is responsive to electrical impulse received through conductor 36 to retract plunger 123. A link 126 is pivotally connected by means of pin 127 to the free end of plunger 123, and is pivotally connected at the other end thereof to crank arm 117 by pin 128.

As seen in the solid outline, plunger 123 is extended with shaft 114 in the lowered position, when solenoid 112 is relaxed. Upon receipt of a signal from conductor 36, solenoid 122 is energized, pulling plunger 123 in the direction of arrow D, pivoting crank arm 117 about 118 and raising shaft 114 arcuately, as described by arrowed line E, to the raised position, as illustrated in the dashed outline 114a.

Referring now to FIG. 6, an alternate embodiment of a latching device, generally designated by the reference 130, is illustrated. Seen is a box-like frame 131 which is variously secured to member 21 as hereinbefore described. An electromagnet 132 is carried by frame 131 extending through an appropriately sized aperture 133 in the face panel 134 thereof and secured thereto by any convenient means such as spot welding. A conventional, normally closed contact switch is carried by frame 131 and has a plunger 139 extending through aperture 140 in face panel 134. Electro-magnet 132 communicates with conductor 32, while switch 138 is connected to conductor 36.

Loop 27 at the free end 24 of barrier 22 is secured to an eye 141 having a shank 142 extending therefrom. A ferrous metallic button 143 is secured to shank 142 and has a radial flange 144 extending therefrom. A pilot 145 extends axially from button 143 and is sized to be received within aperture 135 within electro-magnet 132.

The operation of latching device 130 is generally similar to the operation of latching device 60. Prior to the start of the event, pilot 145 is inserted into aperture 135 such that electro-magnet being energized attracts and holds button 143. The force of electro-magnet 132 is sufficient to overcome biasing means 23. Upon a signal received through conductor 32, electro-magnet 132 is de-energized, releasing flexible barrier 22. For this particular embodiment, it is apparent that electrical energy must be continuous to electro-magnetic 132 and, upon disruption of the electrical energy, button 143 is released. This is in reverse order to the electrical energy supply associated with solenoid 87. Therefore, electrical energy is supplied to electro-magnet 132 through a normally closed relay, which is opened in response to a signal from photocell receiver unit 31.

The attraction between electro-magnet 132 and button 143 is not sufficiently strong to withstand the combined force of biasing means 23 and the onrush of a horse when the rider starts prematurely in a penalty situation. Flange 144 normally depresses plunger 139, holding switch 138 in the open position. During a premature start, button 143 is separated from electro-magnet 132, removing the pressure of flange 144 from plunger 139, permitting plunger 139 to extend in accordance with the internal mechanism of the conventional switch 138 and closing the contacts therein to activate the penalty perceptive signalling device 37.

Electro-magnet 132 may be energized is accordance with various schemes. In accordance with one plan, electro-magnet 132 may be normally energized and attract button 143 as pilot 145 is inserted into aperture 135. Alternately, magnet 132 may be activated by a remote switch after contact has been made with button 143. Yet, in accordance with an alternately preferred embodiment of latching means 130, a second plunger type switch may be incorporated into the structure thereof to have a plunger extending within aperture 135 and responding to pressure from pilot 145 to close the circuit supplying electrical energy to electro-magnet 132.

Various changes and modifications to the preferred embodiments of the instant invention as set forth in the foregoing detailed description thereof will readily occur to persons having skill in the art. For example, the displays and switches specifically illustrated as appearing on the console are intended to represent a complete and total control system. Obviously several of the displays, such as the indicator lights and the penalty timing clock, as well as the various switches, could be eliminated, with a functional system remaining. In regard to the latching device 60, alternate switch means could be provided to be activated in response to pressure from hook-shaped member 73 instead of the illustrated switch, which is closed in response to the release of pressure from hook-shaped member 73. Various other changes are equally apparent in view of the foregoing disclosure. To the extent that such changes and modifications depart from the specific embodiments thereof, but do not depart from the spirit thereof, such changes are intended to be included in the scope of the following claims.

Having fully described and disclosed the present invention and the preferred embodiments thereof in such clear and concise terms as to enable those skilled in the art to understand and practice, the invention claimed is:

1. In a rodeo stall for detaining a contestant, which stall includes:

a first stationary support member, a second stationary support member spaced from said first support member and defining an exit opening therebetween for said contestant, a flexible barrier secured at one end to said first support member and having a free end extending substantially to said second support member, and biasing means normally urging said free end of said barrier from said second support member, an improved latching device for use in combination therewith for detachably engaging the free end of said barrier and for releasing said barrier in response to a predetermined signal, said latching device comprising:

a. a frame for attachment to said second support member;

b. engagement means for detachably engaging the free end of said barrier and carried by said frame, said means normally holding said barrier against the force of said biasing means and releasing said barrier in response to the application of additional force to said barrier; and c. release means carried by said frame and cooperating with said biasing means for operatively disengaging said barrier from said engagement means.

2. The latching device of claim 1, wherein said release means is electro-magnetic.

3. The latching device of claim 2, further including switch means activated in response to disengagement of said barrier from said latching device.

4. The latching device of claim 3, wherein said engagement means includes:

a. a generally hook-shaped member pivotally connected to said frame and movable between a retaining position and a releasing position, said hook-shaped member being held in said retaining position by said biasing means, said barrier being urged from said hook-shaped member by said biasing means when said hook-shaped member is in said releasing position;

b. connection means between said hook-shaped member and said release means for moving said hook-shaped member to said releasing position in response to energization of said release means; and c. means for activating said switch means in response to said barrier being disengaged from said hook-shaped member when said hook-shaped member is in said retaining position.

5. The latching device of claim 4, wherein said means for activating said switch means includes biasing means for moving said hook-shaped member to said releasing position after said barrier has been disengaged by the application of force thereto.

6. The latching device of claim 4, further including adjustable stop means for limiting the movement of said hook shaped member in the direction of said retaining position.

7. The latching device of claim 5, wherein said switch means is held in the open position in response to said hook-shaped member being in the retaining position and moves to the closed position in response to said hook-shaped member moving to said releasing position.

* * * * *